United States Patent
Selberg

(10) Patent No.: US 7,792,813 B2
(45) Date of Patent: Sep. 7, 2010

(54) PRESENTING RESULT ITEMS BASED UPON USER BEHAVIOR

(75) Inventor: Erik Warren Selberg, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 363 days.

(21) Appl. No.: 11/848,980

(22) Filed: Aug. 31, 2007

(65) Prior Publication Data

US 2009/0063460 A1 Mar. 5, 2009

(51) Int. Cl.
*G06F 17/30* (2006.01)
(52) U.S. Cl. .................. 707/706; 707/708; 707/721; 707/723
(58) Field of Classification Search .............. 707/3–7, 707/104.1
See application file for complete search history.

(56) References Cited

U.S. PATENT DOCUMENTS

| | | | |
|---|---|---|---|
| 6,513,036 B2 * | 1/2003 | Fruensgaard et al. ............. | 1/1 |
| 6,516,329 B1 * | 2/2003 | Smith ......................... | 715/210 |
| 6,693,651 B2 | 2/2004 | Biebesheimer | |
| 6,701,311 B2 | 3/2004 | Biebesheimer | |
| 7,216,121 B2 | 5/2007 | Bachman et al. | |
| 7,447,678 B2 * | 11/2008 | Taylor et al. .................. | 707/3 |
| 7,584,177 B2 * | 9/2009 | Angelo et al. .................. | 707/3 |
| 7,599,928 B2 * | 10/2009 | Smyth et al. .................. | 1/1 |
| 2002/0049752 A1 * | 4/2002 | Bowman et al. .................. | 707/3 |
| 2003/0163462 A1 * | 8/2003 | Kawamura .................... | 707/3 |
| 2004/0215607 A1 * | 10/2004 | Travis, Jr. .................... | 707/3 |
| 2005/0120311 A1 | 6/2005 | Thrall | |
| 2005/0210042 A1 | 9/2005 | Goedken | |
| 2005/0240580 A1 * | 10/2005 | Zamir et al. .................. | 707/4 |
| 2006/0004711 A1 | 1/2006 | Naam | |
| 2006/0167864 A1 * | 7/2006 | Bailey et al. .................. | 707/3 |
| 2006/0184625 A1 | 8/2006 | Nordvik | |
| 2006/0200445 A1 * | 9/2006 | Chen et al. .................... | 707/2 |
| 2006/0265391 A1 | 11/2006 | Posner | |
| 2006/0288001 A1 | 12/2006 | Costa | |

(Continued)

OTHER PUBLICATIONS

SearchTrack Data Sheet (server application), Copyright New Idea Engineering, Inc. 1996-2007, http://www.ideaeng.com/ds/searchtrack.html.

(Continued)

*Primary Examiner*—Don Wong
*Assistant Examiner*—Hanh B Thai
(74) *Attorney, Agent, or Firm*—Shook, Hardy & Bacon, L.L.P.

(57) ABSTRACT

Methods, systems, and computer storage media having computer-executable instructions embodied thereon that, when executed, perform methods for identifying and presenting the "best" answer to a given search query as it relates to a particular user based upon that user's behavior are provided. Upon receipt of a search query and determination of the search result items satisfying the query, it is determined whether the user has executed the same or substantially similar search in the past and, if so, if there is a particular one of the search result items that s/he has a tendency to select when the search result items are presented. If a particular result is frequently selected, that result is prominently presented (e.g., highlighted, display with a border, displayed in a different font than other results, or the like) among the search result items making it easier for the user to quickly identify the desired result.

14 Claims, 6 Drawing Sheets

U.S. PATENT DOCUMENTS

| | | |
|---|---|---|
| 2007/0033184 A1 | 2/2007 | Friedman |
| 2007/0088695 A1 | 4/2007 | Bleyendaal |
| 2007/0192289 A1* | 8/2007 | Lin et al. ............... 707/3 |
| 2007/0208621 A1* | 9/2007 | Park et al. ............. 705/14 |
| 2008/0010253 A1* | 1/2008 | Sidhu et al. ............. 707/3 |
| 2008/0016046 A1* | 1/2008 | Guha ...................... 707/3 |
| 2008/0059258 A1* | 3/2008 | Lee ......................... 705/7 |
| 2008/0071742 A1* | 3/2008 | Yang et al. ............. 707/3 |
| 2008/0097969 A1* | 4/2008 | Lee et al. ............... 707/3 |
| 2008/0172362 A1* | 7/2008 | Shacham et al. ....... 707/3 |
| 2008/0172374 A1* | 7/2008 | Wolosin et al. ........ 707/5 |
| 2008/0228544 A1* | 9/2008 | Woosley et al. ........ 705/8 |
| 2008/0235205 A1* | 9/2008 | Fein et al. .............. 707/5 |
| 2008/0270366 A1* | 10/2008 | Frank ..................... 707/3 |
| 2008/0313164 A1* | 12/2008 | Lee et al. ............... 707/5 |
| 2009/0034805 A1* | 2/2009 | Perlmutter et al. .... 382/118 |
| 2009/0157479 A1* | 6/2009 | Caldwell et al. ...... 705/10 |

OTHER PUBLICATIONS

"Best bet" web search, Copyright 2007 Microsoft, http://search-science.spaces.live.com/blog/cns!9D2D609139C8C9EF!3360.entry.

Marinilli, Mauro et al., "A Case-Based Approach to Adaptive Information Filtering for the WWW", http://wwwis.win.tue.nl/asum99/marinilli/marinilli.html.

Choosing the Right Search Tool, http://ecuip.lib.uchicago.edu/teachers/training/searching/tools.html.

Zhai, Yanhong et al., "Structured Data Extraction from the Web Based on Partial Tree Alignment", IEEE Transactions on Knowledge and Data Engineering, vol. 18, No. 12, Dec. 2006, doi.ieeecomputersociety.org/10.1109/TKDE.2006.197.

Zhai, Yanhong et al., "Web Data Extraction Based on Partial Tree Alignment", WWW2005, May 10-14, 2005, www2005.org/cdrom/docs/p76.pdf.

International Search Report with Written Opinion dated Jan. 29, 2007.

* cited by examiner

PRESENTING RESULT ITEMS BASED UPON USER BEHAVIOR

BACKGROUND

Search engines are frequently utilized by users seeking information or an answer to a particular query. The "best" answer to a given query, however, may differ among users. For instance, user A may prefer website X to provide information regarding traffic conditions on a particular interstate while user B may prefer website Y when seeking the same type of information. Search engines, however, upon receiving a substantially similar search query from each of users A and B, do not distinguish the users from one another and return substantially similar search result items, in substantially the same order, to both users. Upon receiving the results, both user A and user B are forced to filter through the returned result items to locate the desired website link before each is able to access the desired result.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems and methods for identifying and presenting the "best" answer to a given search query as it relates to a particular user based upon that user's behavior. Upon receipt of a search query and determination of the search result items satisfying the query, it is determined whether the user has executed the same or a substantially similar search in the past and, if so, if there is a particular one of the search result items that s/he has a tendency to select when the search result items are presented. If a particular result is frequently selected, that result is prominently presented (e.g., highlighted, displayed with a border, displayed in a different font than other results, or the like) among the search result items making it easier for the user to quickly identify the desired result.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Figure 1:
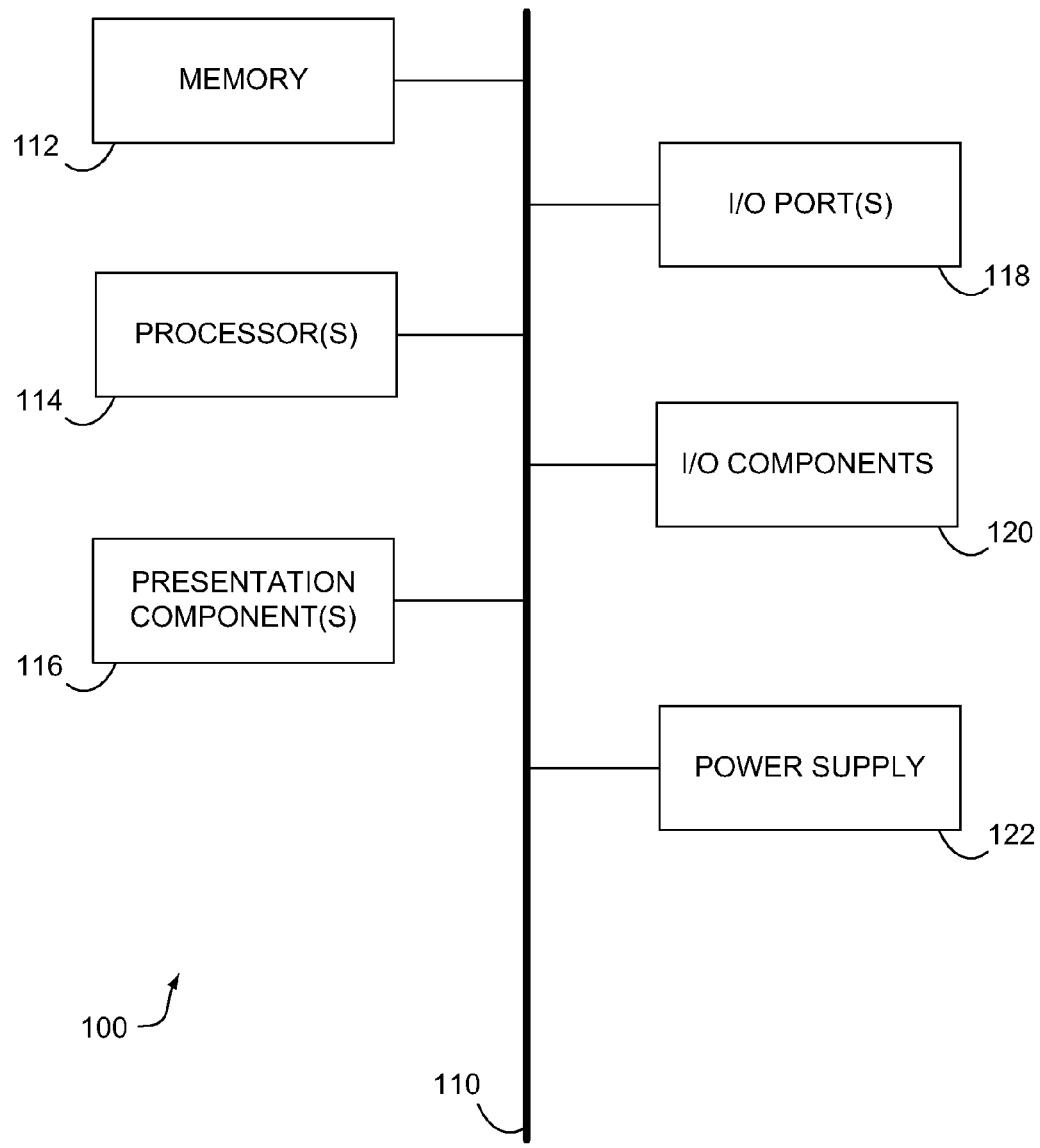
FIG. 1 is a block diagram of an exemplary computing environment suitable for use in implementing embodiments of the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. Embodiments of the present invention may be practiced in a variety of system configurations, including hand-held devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM);

flash memory or other memory technologies; CDROM, digital versatile disks (DVDs) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
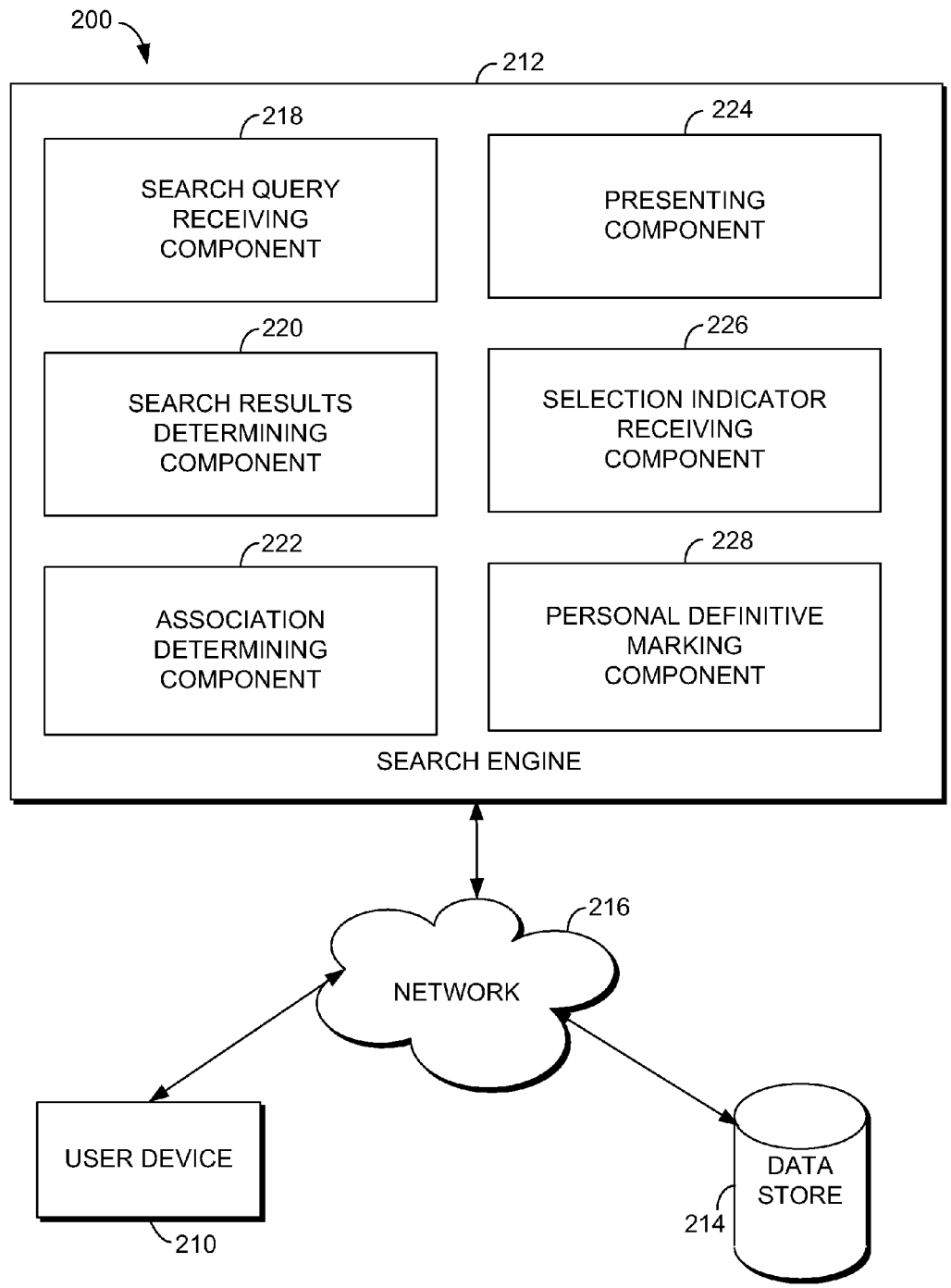
FIG. 2 is a block diagram of an exemplary computing system suitable for use in implementing embodiments of the present invention.

Turning now to FIG. 2, a block diagram is illustrated, in accordance with an embodiment of the present invention, showing a system 200 configured to identify and present personal definitives. A "personal definitive," as the term is utilized herein, is the "best" answer to a given search query as it relates to a particular user. It will be understood and appreciated by those of ordinary skill in the art that the execution analysis system 200 shown in FIG. 2 is merely an example of one suitable computing system environment and is not intended to suggest any limitation as to the scope of use or functionality of embodiments of the present invention. Neither should the system 200 be interpreted as having any dependency or requirement related to any single component or combination of components illustrated therein. Further, the system 200 may be provided as a stand-alone product, as part of a software development environment, or any combination thereof.

The system 200 includes a user device 210, a search engine 212, and a data store 214 all in communication with one another via a network 216. The network 216 may include, without limitation, one or more local area networks (LANs) and/or wide area networks (WANs). Such networking environments are commonplace in offices, enterprise-wide computer networks, intranets, and the Internet. Accordingly, the network 216 is not further described herein.

The data store 214 is configured to store personal definitives and their associated user and query information. In various embodiments, such information may include, without limitation, user identifications, search queries, search result items (or a representation thereof), selection counts for previously presented search result items, prominent presentation markers, and the like. In embodiments, the data store 214 is configured to be searchable for one or more of the items stored in association therewith. It will be understood and appreciated by those of ordinary skill in the art that the information stored in the data store 214 may be configurable and may include any information relevant to search queries and associated user identification information. The content and volume of such information are not intended to limit the scope of embodiments of the present invention in any way. Further, though illustrated as a single, independent component, data store 214 may, in fact, be a plurality of data stores, for instance, a database cluster, portions of which may reside on the user device 210, the search engine 212, another external computing device (not shown), and/or any combination thereof.

Each of the computing device 210 and the search engine 212 shown in FIG. 2 may be any type of computing device, such as, for example, computing device 100 described above with reference to FIG. 1. By way of example only and not limitation, each of the computing device 210 and the search engine 212 may be a personal computer, desktop computer, laptop computer, handheld device, mobile handset, consumer electronic device, and the like. Additionally, the user device 210 may further include a keyboard, keypad, stylus, joystick, and any other input-initiating component that allows a user to provide wired or wireless data to the network 216. It should be noted, however, that the present invention is not limited to implementation on such computing devices, but may be implemented on any of a variety of different types of computing devices within the scope of embodiments hereof.

As shown in FIG. 2, the search engine 212 is configured to receive search queries and present search result items, including personal definitives, which satisfy the received query. The search engine 212 includes a search query receiving component 218, a search results determining component 220, an association determining component 222, a presenting component 224, a selection indicator receiving component, and a personal definitive marking component 228. In some embodiments, one or more of the illustrated components 218, 220, 222, 224, 226 and 228 may be implemented as stand-alone applications. In other embodiments, one or more of the illustrated components 218, 220, 222, 224, 226 and 228 may be integrated directly into the operating system of the search engine 212 and/or the user device 210. It will be understood by those of ordinary skill in the art that the components 218, 220, 222, 224, 226 and 228 illustrated in FIG. 2 are exemplary in nature and in number and should not be construed as limiting. Any number of components may be employed to achieve the desired functionality within the scope of embodiments of the present invention.

The search query receiving component 218 is configured for receiving a search query associated with a user identification, that is, a unique identifier stored in a cookie in the browser that is associated with a particular user and/or a particular user device (e.g., user device 210). The search query may be received utilizing a variety of mechanisms known to those of ordinary skill in the art including, but not limited to, textual input into a specified display field utilizing a keyboard, stylus, or joystick associated with the user device.

The search results determining component 220 is configured for determining a plurality of search result items related to (e.g., that satisfy) a received search query. As such, in embodiments, the search results determining component 220 parses the received search query into one or more search terms/phrases and compares the search term(s)/phrase(s) to a search index associated with a data store (for instance, data store 214). Any search result items stored in association with the data store (e.g., data store 214) and referenced in the search index are compiled and a predetermined ranking algorithm is applied to determine how many of the satisfying results will be presented to the user and in what order. Data parsing, database indexing and search result item ranking algorithms are well known to those of ordinary skill in the art and, accordingly, are not further described herein.

The association determining component 222 is configured for determining if an identical or similar search query has been previously input in association with the user identification. A search query may be "similar" if, for instance, substantially similar search result items would be returned upon entry of that query relative to the query in question (e.g., if eight of the top ten search result items would be the same) if both queries were input into the search engine 212 at substantially the same time. If it is determined that an identical or similar search query has been previously input in association with the user identification, the association determining component 222 is further configured to determine if any of the determined search result items has been previously associated with the user identification and the identical or similar query, and has been selected by the user. That is, it is determined, upon prior entry of the identical or similar search query and presentation of the related search result items, if any of the search result items has been previously selected by the user.

If it is determined that one or more of the determined search result items has been previously associated with the user identification and the identical or similar search query, and has been selected by the user, it is determined if such selection has occurred under such circumstances a number of times that matches or exceeds a predetermined threshold number of times. For instance, in one embodiment, the predetermined threshold number of times is three. In this embodiment, it is determined if the user associated with the user identification has selected a particular search result item three or more times when such result item is presented in response to the identical or similar search query. If it is determined that such selection has occurred under the provided circumstances a number of times that meets or exceeds the predetermined threshold, such search result item is identified as a personal definitive of the user associated with the user identification.

In one embodiment, such identification has been previously made and an indication of such is already stored in association with the user identification and the search query, for instance, in association with data store 214. In this embodiment, the steps involved in determining selection and identifying the search result item as a personal definitive may be skipped and the association determining component 222 may instead determine whether any of the determined search result items has already been identified as a personal definitive associated with the user identification. It will be understood by those of ordinary skill in the art that any and all such embodiments and combinations thereof, are contemplated to be within the scope of embodiments of the present invention.

The presenting component 224 is configured to present the plurality of search result items. Typically, such presentation will include a visual display of search result items (or selectable indicators thereof). However, other forms of presentation, such as audio presentation and/or audio/visual presentation, are contemplated to be within the scope hereof. If it is determined (e.g., utilizing association determining component 222) that one or more of the determined search result items is a personal definitive, the presenting component 224 is further configured for prominently presenting the personal definitive(s). Such prominent presentation may include, but is not limited to, outlining the personal definitive(s), displaying the personal definitive(s) in a different font relative to other displayed search result items, displaying the personal definitive(s) in a different font size relative to other displayed search result items, displaying the personal definitive(s) in a different font color relative to other displayed search result items, and displaying the personal definitive(s) on an area of a display surface that is separated from other displayed search result items. In another embodiment, such prominent presentation includes copying the personal definitive(s) (or the indicator(s) thereof) and displaying the copied personal definitive(s) (or the indicator(s) thereof) to a prominent location on the display surface, e.g., to the top of a vertical listing of search result items. In this way, if the user frequently conducts the search query and is used to searching for the personal definitive search result item in a particular location within the search result item listing, the personal definitive will still be in that location. In yet another embodiment, the personal definitive(s) (or the indicator(s) thereof) may be moved such that the personal definitive(s) (or the indicator(s) thereof) is displayed exclusively in a prominent location on the display surface. Any and all such variations, and any combinations thereof, are contemplated to be within the scope of embodiments of the present invention.

The selection indicator receiving component 226 is configured for receiving an indicator that one of the plurality of presented search result items (whether it be a personal definitive or another search result item) has been selected. That is, once the search result items determined to satisfy the search query have been determined, any personal definitives have been identified, and the search result items have been presented, the selection indicator receiving component 226 is configured to determine if the user selects a particular search result item. If the user selects a presented search result item, the selected search result item, the user identification, and the query are analyzed, e.g., utilizing the association determining component 222, to determine if such selection is the Nth selection (wherein N is the predetermined threshold number of times for identifying a personal definitive) of such item under the given conditions. If it is determined that such selection is not the Nth selection of such item, a count of the selection is stored in association with the user identification, the search query, and the search result item, for instance, in association with data store 124.

If, however, it is determined that such selection is the Nth selection of such item under the given condition, the selected search result item is marked or tagged with a prominent presentation marker and stored in association therewith, e.g., in association with data store 214. That is, the selected search result item is identified as a personal definitive and such identification is stored in association with the item, the search query, and the result item. Such marking is done utilizing the personal definitive marking component 228. Thus, the next time the identical or similar search query is input by the user, the selected search result item will be prominently displayed as a personal definitive of the user.

Figure 3:
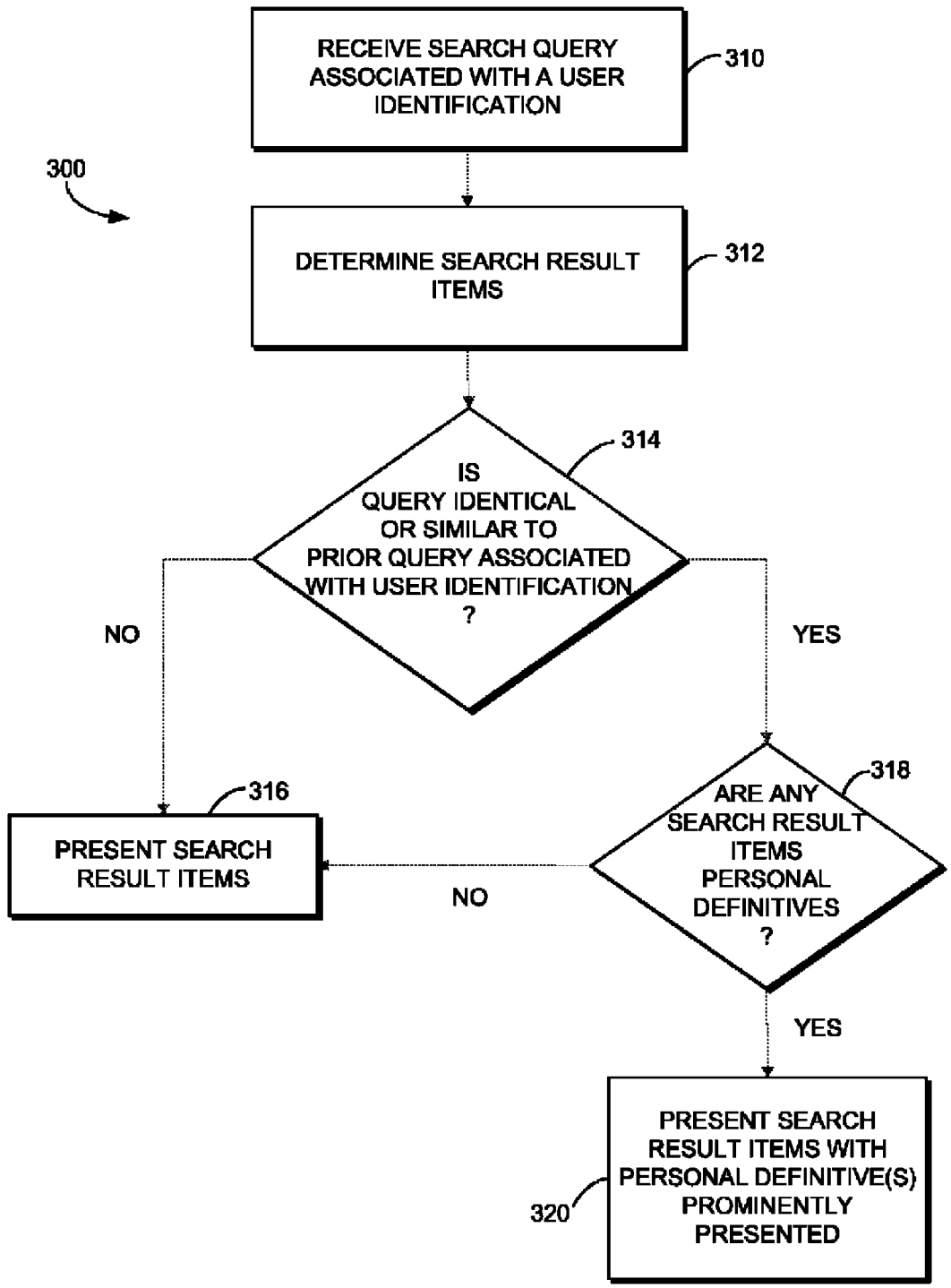
FIG. 3 is a flow diagram showing a method for presenting search result items based upon user behavior, in accordance with an embodiment of the present invention.

Turning now to FIG. 3, a flow diagram is illustrated that shows a method 300 for presenting search result items based upon prior user behavior, in accordance with an embodiment of the present invention. Initially, as indicated at block 310, a search query is received, e.g., utilizing search query receiving component 218 of FIG. 2. Subsequently, as indicated at block 312, search result items that satisfy the received search query are determined, for instance, utilizing search results determining component 220 of FIG. 2. Next, it is determined if the received search query is identical or similar to a previously received query associated with the user identification, e.g., utilizing association determining component 222 of FIG. 2. This is indicated at block 314.

If it is determined that an identical or similar search query has not been previously received in association with the user identification, the determined search result items are presented in accordance with a predetermined search result ranking algorithm, for instance, utilizing presenting component 224. This is indicated at block 316. If, however, it is determined that an identical or similar search query has been previously received in association with the user identification, it is next determined whether any of the search result items are personal definitives. That is, it is determined whether any of the determined search result items is either already associated with a prominent presentation marker and/or whether any of the determined search result items has been previously selected by the user when presented in association with the received search query (or a similar query) a predetermined threshold number of times. This is indicated at block 318. If it is determined that none of the determined search result items is a personal definitive, the search result items are presented in accordance with a predetermined search result ranking algorithm (e.g., utilizing presenting component 224), as indicated at block 316.

If, however, it is determined that one or more of the determined search result items is a personal definitive, the search result items are presented (generally in accordance with the predetermined search result ranking algorithm) with the identified personal definitive(s) prominently presented. This is indicated at block 320. (Methods for prominently presenting a personal definitive were described herein above with reference to FIG. 2.)

Figure 4:
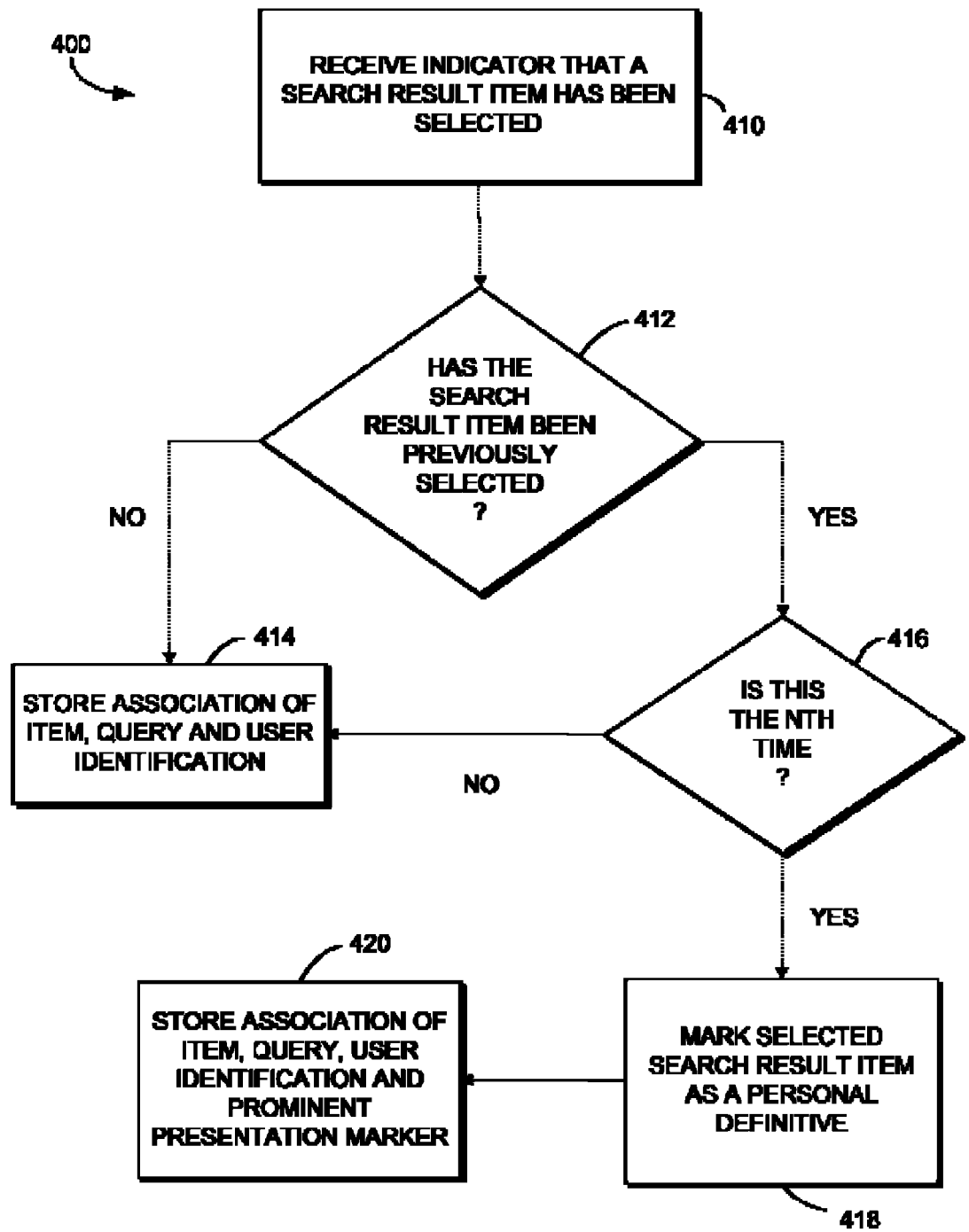
FIG. 4 is a flow diagram showing a method for identifying personal definitives, in accordance with an embodiment of the present invention.

With reference to FIG. 4, a flow chart is illustrated showing a method 400 for identifying and/or marking a presented search result item as a personal definitive, in accordance with an embodiment of the present invention. Initially, as indicated at block 410, an indicator that a presented search result item has been selected by a user is received, e.g., utilizing selection indicator receiving component 226 of FIG. 2. Next, as indicated at block 412, it is determined if the selected search result item has been previously selected when presented in association with the user identification and the search query, for instance, utilizing association determining component 222 of FIG. 2. If it is determined that the search result items has not been previously selected when presented under the specified conditions, a count of the selection is stored in association with the search query, the search result item, and the user identification, for instance, in association with data store 214 of FIG. 2. This is indicated at block 414.

If, however, it is determined that the search result item has been previously selected when presented in association with the user identification and the search query, it is subsequently determined if this is the Nth time such selection has occurred, wherein N is a predetermined threshold number of times. This is indicated at block 416. If it is determined that the selection is not the Nth selection of the search result item when presented under the specified conditions, a count of the selection is stored in association with the search query, the search result item, and the user identification (e.g., in association with data store 214 of FIG. 2), as indicated at block 414.

If it is determined that the selection is the Nth selection of the search result item, the selected search result item is identified as a personal definitive and marked with a prominent presentation marker (e.g., utilizing personal definitive marking component 228), as indicated at block 418. Accordingly, the next time the identical or a similar search result query is received in association with the user identification, the search result item identified and marked as a personal definitive will be prominently displayed relative to other search result items satisfying the query. Subsequently, as indicated at block 420, the prominent presentation marker, the search query, the search result item and the user identification are stored in association with one another, for instance, in association with data store 214 of FIG. 2. If desired, a count of the selection may also be stored.

Figure 5:
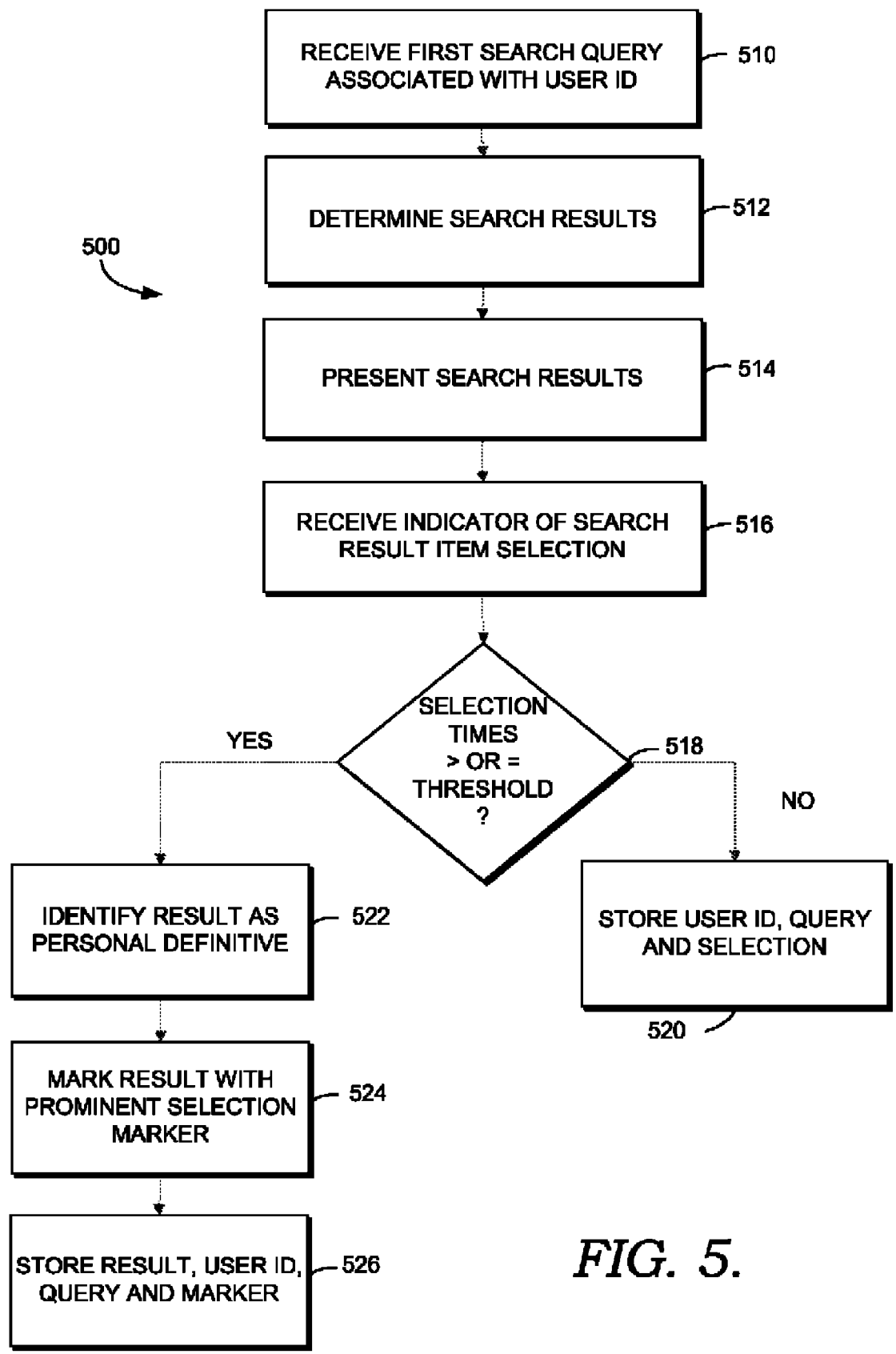
FIG. 5 is a flow diagram showing a method for identifying and marking personal definitives, in accordance with an embodiment of the present invention.

Turning now to FIG. 5, a flow diagram is shown illustrating a method 500 for identifying and marking personal definitives, in accordance with an embodiment of the present invention. Initially, as indicated at block 510, a first search query associated with a user identification is received, for instance, utilizing search query receiving component 218 of FIG. 2. Next, as indicated at block 512, a first plurality of search result items related to the received first search query are determined, e.g., utilizing search results determining component 220 of FIG. 2. Next, the determined search result items are presented in accordance with a predetermined search result ranking algorithm, for instance, utilizing presenting component 224 of FIG. 2. This is indicated at block 514. Next, as indicated at block 516, an indicator is received that one of the presented search result items has been selected, e.g., by selection indicator receiving component 226 of FIG. 2. Subsequently, as indicated at block 518, it is determined whether the number of times the selected search result has been selected when presented in association with the user identification and an identical or similar search query meets or exceeds a predetermined threshold (for instance, utilizing association determining component 222). It will be understood by those of ordinary skill in the art that if the selected search result item has been previously identified as a personal definitive and an indication of such is already stored in association with the user identification and the search query, for instance, in association with data store 214, such determination may instead be made at block 518 and a count of the selection may be stored in association with the user identification, the search query, and the query result and the remaining method steps may be skipped. Any and all such embodiments, and combinations thereof, are contemplated to be within the scope of embodiments of the present invention.

If it is determined that the number of times the selected search result has been selected when presented under the specified conditions does not meet or exceed the predetermined threshold, a count of the selection, the search query and the query result item (or an indicator thereof) are stored in association with the user identification (for instance, in association with data store 214 of FIG. 2). This is indicated at block 520.

If, however, it is determined that the number of times the selected search result has been selected when presented in association with the user identification and an identical or similar search query meets or exceeds the predetermined threshold, the selected search result item is identified as a personal definitive, for instance, utilizing association determining component 222 of FIG. 2. This is indicated at block 522. Subsequently, the selected search result item identified as a personal definitive is marked with a prominent selection marker (for instance, utilizing personal definitive marking component 228 of FIG. 2), as indicated at block 524. Then, a count of the selection, the search query, the query result item (or an indicator thereof), and the prominent selection marker are stored in association with the user identification, e.g., in association with data store 214 of FIG. 2. This is indicated at block 526.

Figure 6:
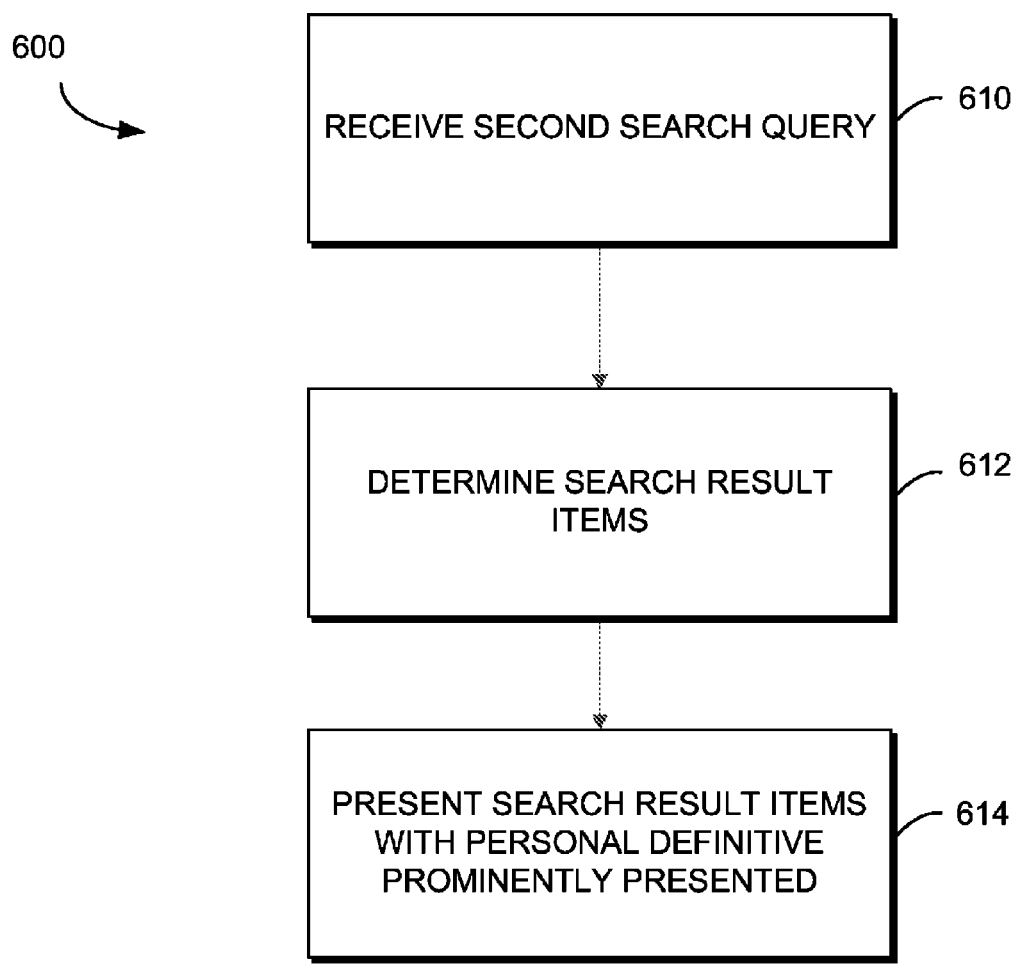
FIG. 6 is a flow diagram presenting search result items based upon user behavior, in accordance with an embodiment of the present invention.

Turning now to FIG. 6, a flow diagram is illustrated that shows a method 600 for presenting search result items based upon user behavior, in accordance with an embodiment of the present invention. Initially, as indicated at block 610 a search query associated with a user identification is received, for instance, utilizing search query receiving component 218 of FIG. 2. Next, as indicated at block 612, a plurality of search result items related to and/or satisfying the received search query are determined, for instance, utilizing the search results determining component 220 of FIG. 2, wherein at least one of the determined search result items has been identified as a personal definitive associated with the user identification. Subsequently, as indicated at block 614, the search result items are presented generally in accordance with a predetermined search result ranking algorithm with the exception that the identified personal definitive(s) is prominently presented with respect to the other search result items. Such presentation may occur, for instance, utilizing presenting component 224 of FIG. 2. Thus, the user may readily identify those search result items that he or she has previously selected more frequently than other search result items when conducting the identical or a similar query.

As can be understood, embodiments of the present invention relate to methods, systems, and computer storage media having computer-executable instructions embodied thereon that, when executed, perform methods in accordance with embodiments hereof, for identifying and presenting the "best" answer to a given search query as it relates to a particular user based upon that user's behavior. Upon receipt of a search query and determination of the search result items satisfying the query, it is determined whether the user has executed the same or a substantially similar search in the past and, if so, if there is a particular one of the search result items that s/he has a tendency to select when the search result items are presented. If a particular result is frequently selected, that result is prominently presented (e.g., highlighted, displayed with a border, displayed in a different font than other results, or the like) among the search result items making it easier for the user to quickly identify the desired result.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer storage media having computer-executable instructions embodied thereon that, when executed, perform a method for presenting search result items based upon prior user behavior, the method comprising:
    receiving a search query associated with a user identification;
    determining a plurality of search result items related to the received search query;
    determining if at least one of the plurality of search result items has been previously associated with the user identification in associated with the received search query and selected a predetermined threshold number of times; and
    presenting the plurality of search result items, wherein if it is determined that at least one of the plurality of search result items has been previously associated with the user identification in association with the received search query and selected the predetermined threshold number of times, the at least one of the plurality of search result items is prominently presented, wherein determining if at least one of the plurality of search result items has been previously associated with the user identification in association with the received search query a predetermined threshold number of times includes determining if at least one of the plurality of search result items has been previously associated with the user identification is association with a search query identical to the received search query or a search query similar to the received search query;
    receiving an indicator that one of the plurality of presented search result items has been selected;
    storing an association of the one of the plurality of presented search result items, the received search query, and the user identification;
    determining if the one of the plurality of presented search result items associated with the received indicator has previously been selected in association with the user identification;
    if it is determined that the one of the plurality of presented search result items associated with the received indicator has previously been selected in association with the user identification, the method further comprises determining if the one of the plurality of presented search result items associated with the received indicator has been selected the predetermined threshold number of times; and
    if it is determined that the one of the plurality of presented search result items associated with the received indicator has been selected the predetermined threshold number of times, the method further comprises marking the one of the plurality of presented search result items with a prominent presentation marker, and wherein storing the association of the one of the plurality of presented search result items, the received search query, and the user identification further includes storing the prominent presentation marker in association therewith.

2. The one or more computer storage media of claim 1, wherein presenting the plurality of search result items comprises displaying the plurality of search result items.

3. The one or more computer storage media of claim 2, wherein prominently presenting the at least one of the plurality of search result items comprises at least one of highlighting the at least one of the plurality of search result items, outlining the at least one of the plurality of search result items, displaying the at least one of the plurality of search result items in a different font relative to other displayed search result items, displaying the at least on of the at least one of the plurality of search result items in a different font size relative to the other displayed search result items, displaying the at least one of the least one of the plurality of search result items in a different font color relative to the other displayed search result items, displaying the at least one of the plurality of search result items on an area of a display surface that is separated from the other displayed search result items, copying the at least one of the plurality of search result items and displaying the copied search result item to a prominent location of the display surface, and moving the at least one of the plurality of search result items to a prominent location of the display surface.

4. Computer-readable media having computer-usable instructions embodied thereon that, when executed, implement a system for performing a method for presenting search result items based upon prior user behavior, the system comprising:
    a search query receiving component for receiving a search query associated with a user identification;
    a search results determining component for determining a plurality of search result items related to the received search query;
    an association determining component for determining if any of the plurality of search result items has been previously associated with the user identification is association with an identical or similar search query and, if so, for determining if any of the plurality of search result items that has been previously associated with the user identification in association with an identical or similar search query has been selected a predetermined threshold number of times by the user; and a presenting component for presenting the plurality of search result items, wherein the presenting component prominently presents one or more of the plurality of search result items if it is determined that the one or more of the plurality of search result items has been previously associated with the user identification in association with the identical or similar search query and has been selected the predetermined threshold number of times by the user.

5. The media of claim 4, further comprising a selection indicator receiving component for receiving an indicator that one of the plurality of presented search result items has been selected.

6. The media of claim 5, wherein the association determining component is further configured for determining if the one of the plurality of presented search result items associated with the indicator has been selected a predetermined threshold number of times.

7. The media of claim 6, further comprising a personal definitive marking component for marking the one of the plurality of presented search result items associated with the indicator with a prominent presentation marker.

8. The media of claim 7, wherein the presenting component is configured for displaying the plurality of search result items and for displaying the prominent presentation marker in association with the one of the plurality of presented search result items.

9. The media of claim 8, wherein the prominent presentation marker comprises at least one of highlighting the at least one of the plurality of search result items, outlining the at least one of the plurality of search result items, displaying the at least one of the plurality of search result items in a different font relative to other displayed search result items, displaying the at least one of the at least one of the plurality of search result items in a different font size relative to the other displayed search result items, displaying the at least one of the at least one of the plurality of search result items in a different font color relative to the other displayed search result items, displaying the at least one of the plurality of search result items on an area of a display surface that is separated from the other displayed search result items, copying the at least one of the plurality of search result items and displaying the copied search result item to a prominent location of the display surface, and moving the at least one of the plurality of search result items to a prominent location of the display surface.

10. A method is a computing environment for identifying personal definitives based upon prior user behavior, the method comprising:
receiving a first search query associated with a user identification;
determining a first plurality of search result items related to the first search query or a search query similar to the first search query;
presenting the first plurality of search results;
receiving an indicator that one of the first plurality of search result items has been selected;
determining if the one of the first plurality of search result items associated with the received indicator has been selected a predetermined threshold number of times when the one of the first plurality of search result items has been presented in association with the first search query or the search query similar to the first search query and the user identification; and
if is determined that the one of the first plurality of search result items associated with the received indicator has been selected a predetermined threshold number of times when the one of the first plurality of search result items has been presented in association with the first search query of the search query similar to the first search query and the user identification, the method further comprises identifying the one of the first plurality of search result items as a personal definitive associated with the user identification.

11. The method of claim 10, further comprising marking the one of the first plurality of search result items identified as a personal definitive associated with the user identification with a prominent presentation marker, and storing the prominent presentation marker in association with the one of the first plurality of search result items identified as a personal definitive associated with the user identification, the received search query or the search query similar to the first query, and the user identification.

12. The method of claim 11, further comprising:
receiving a second search query associated with the user identification, the second search query being identical or similar to the first search query;
determining a second plurality of search result items related to the second search query, wherein the second plurality of search result items includes the one of the first plurality of search result items that has been identified as a personal definitive associated with the user identification; and
presenting the second plurality of search result items, wherein the one of the first plurality of search result items that has been identified as a personal; definitive associated with the user identification is prominently presented.

13. The method of claim 12, wherein presenting the second plurality of search result items comprises displaying the plurality of search result items.

14. The method of claim 13, wherein prominently presenting the at least one of the first plurality of search result items that has been identified as a personal definitive associated with the user identification comprises at least one of highlighting the at least one of the plurality of search result items, outlining the at least one of the plurality of search result items, displaying the at least one of the plurality of search result items in a different font relative to other displayed search result items, displaying the at least one of the at least one of the plurality of search result items in a different font size relative to the other displayed search result items, displaying the at least one of the at least one of the plurality of search result items in a different font color relative to the other displayed search result items, displaying the at least one of the plurality of search result items on an area of a display surface that is separated from the other displayed search result items, and copying the at least one of the plurality of search result items and displaying the copied search result item to a prominent location of the display surface.

* * * * *